United States Patent
Monte

(10) Patent No.: US 6,423,354 B1
(45) Date of Patent: Jul. 23, 2002

(54) LOW PH ANTIMICROBIAL FOOD COMPOSITION FROM TOTAL MILK PROTEIN AND PROCESS OF MANUFACTURING SAME

(76) Inventor: Woodrow C. Monte, 7634 W. Overfield Dr., Casa Grande, AZ (US) 85222

(*) Notice: Subject to any disclaimer, the term of this patent is extended or adjusted under 35 U.S.C. 154(b) by 36 days.

(21) Appl. No.: 09/654,372

(22) Filed: Sep. 1, 2000

(51) Int. Cl.$^7$ .................. A23C 9/154; A23C 9/158; A23C 9/20
(52) U.S. Cl. .............. 426/72; 426/73; 426/74; 426/321; 426/335; 426/800
(58) Field of Search .............. 426/72, 73, 74, 426/321, 335, 800

(56) References Cited

U.S. PATENT DOCUMENTS

| | | |
|---|---|---|
| 3,978,243 A * | 8/1976 | Pedersen .............. 426/573 |
| 4,081,555 A | 3/1978 | Sawhill |
| 4,112,123 A | 9/1978 | Roberts |
| 4,199,608 A | 4/1980 | Gilmore et al. |
| 4,452,823 A | 6/1984 | Connolly et al. |
| 4,542,035 A | 9/1985 | Huang et al. |
| 4,631,196 A | 12/1986 | Zeller |
| 4,711,953 A | 12/1987 | Roger et al. |
| 4,771,001 A | 9/1988 | Bailey et al. |
| 4,830,868 A | 5/1989 | Wade et al. |
| 4,931,300 A | 6/1990 | Monte |
| 5,156,875 A | 10/1992 | Monte |
| 5,186,971 A | 2/1993 | Girsh |
| 5,389,391 A | 2/1995 | Monte |
| 5,401,523 A | 3/1995 | Degen et al. |
| 5,413,804 A | 5/1995 | Rhodes |
| 5,614,241 A | 3/1997 | Monte |
| 5,948,452 A | 9/1999 | Monte |
| 6,171,633 B1 * | 1/2001 | Dulebohn et al. .......... 426/577 |
| 6,221,419 B1 * | 4/2001 | Gerrish .................. 426/577 |
| 6,287,623 B1 * | 9/2001 | Nakayama et al. ......... 426/800 |

FOREIGN PATENT DOCUMENTS

EP  0914 779  12/1999

OTHER PUBLICATIONS

Product Bulletin, TMP 1100 Milk Protein Isolate, Spec. No. 211100, published Feb. 1, 1997, New Zealand Milk Products, Inc. Santa Rosa, CA.

Hoefler, Pectin, Chemistry, Functionality, & Applications, published by Hercules Incorporated, Wilmington, DE, publication date Jan. 2000.

* cited by examiner

Primary Examiner—Helen Pratt
(74) Attorney, Agent, or Firm—Miller & Martin LLP

(57) ABSTRACT

This invention relates to a low pH, nutritionally balanced food composition which has extended shelf life, high antimicrobial activity, and which includes casein proteins and a method manufacturing same.

13 Claims, No Drawings

LOW PH ANTIMICROBIAL FOOD COMPOSITION FROM TOTAL MILK PROTEIN AND PROCESS OF MANUFACTURING SAME

This invention relates to nutritionally balanced food compositions, which may be used for oral ingestion or for ingestion along the digestive tract and a process for manufacturing such food compositions. More particularly, the invention relates to nutritionally balanced liquid food compositions which have a low pH, extended shelf life, high antimicrobial activity, and which include protein in solution and in colloidal suspension or, alternately, in only colloidal suspension. The primary protein source for the food composition is milk proteins, including caseins.

BACKGROUND OF THE INVENTION

Liquid nutritionally balanced food compositions are known in the art. See, for example, my U.S. Pat. No. 4,931,300 for "ANTIMICROBIAL FOOD COMPOSITION".

Liquid nutritionally balanced powdered food compositions like those described in my U.S. Pat. No. 4,931,300 have several potential disadvantages. Protein tends to precipitate from liquid solutions which, like the food composition in U.S. Pat. No. 4,931,300, have acidic pH values in the range of 2.0 to 5.5. In particular, protein tends to precipitate from such liquid solutions when the solutions are heated to a high temperature to sterilize the solutions. Solutions with low pH values in the range of 2.0 to 5.5 are often preferred for nutritional food compositions because the acidity of the solutions normally provides a high level of antimicrobial activity. However, even the food composition in my U.S. Pat. No. 4,931,300 must be refrigerated after it is reconstituted and must then be utilized within about seventy-two hours. Even though the seventy-two hour shelf life of the reconstituted food composition is relatively short, it is still substantially longer than the shelf life of other comparable food compositions. See, for example, U.S. Pat. No. 4,112,123 to Roberts, where the shelf life of a comparable reconstituted refrigerated food composition is only about twenty-four hours.

Some attempts to address these and other problems are illustrated in my U.S. Pat. Nos. 5,156,875 and 5,614,241. Each of these patents utilize a water soluble protein, preferably whey protein, in conjunction with a protein stabilizer system to control precipitation of the proteins out of the aqueous food composition.

In practice, however, the food compositions of the type described in U.S. Pat. Nos. 4,112,123, 4,931,300, 5,156,875 and 5,614,241 have each encountered continued problems with precipitation of the proteins during storage in liquid form or after reconstitution with an aqueous medium such as water. The food compositions of U.S. Pat. Nos. 5,156,875 and 5,614,241 have both been found to undergo significant precipitation of the proteins after sterilization and packaging, thereby reducing the viable shelf life of the product.

Additionally, the prior food compositions of U.S. Pat. Nos. 4,112,123, 4,931,300, 5,156,875 and 5,614,241 all required aseptic sterilization and packaging. Aseptic sterilization, also called high temperature/short time (HTST) sterilization, is a more restrictive, slower and more expensive process than the general commercial retort sterilization used in typical canning processes for food products. Aseptic sterilization is also a more cumbersome commercial process as the product and the packaging must each be separately sterilized prior to packaging the product. By contrast, retort sterilization allows both the packaging and the food product within it to be sterilized simultaneously, a process much more adaptable and useful in mass production/canning operations. However, because retort sterilization is a much more vigorous sterilization process than aseptic sterilization, utilizing higher time heat ratios and longer sterilization times. Retort sterilization is unsuitable for the prior art food compositions because such compositions break down and form precipitants during the longer periods during which the product is held at high temperature which characterize commercial retort sterilization processes.

Finally, prior nutritionally balanced low pH food compositions have required careful selection of the particular proteins to be used due to solubility considerations affecting precipitants. For this reason, food compositions such as those disclosed in my prior patents described above relied upon the use of previously hydrolized proteins or water soluble proteins. In practice, the useful water soluble proteins consisted entirely of whey protein. Whey proteins are known to be useful in nutritional food compositions because they have high nutritional value. However, whey proteins comprise only about 20% of the highly nutritional proteins which are derived from milk.

Milk proteins have excellent nutritional and functional properties and are widely used in the manufacture of food products. Different functionality, composition and flavor of milk protein products make them ideal for a number of uses. Milk protein is a rich source of essential amino acids. Milk is made up of approximately 3–5 percent protein which can be classified into two basic types, casein proteins and whey proteins. About 80 per cent of the protein content is casein which occurs as complexes or micelles in fresh milk, while the whey proteins are soluble in the milk's serum phase. However, caseins have not been utilized in prior low pH, nutritional food compositions due to their insolubility and concomitant tendency to form precipitants.

Casein forms the largest part of the total protein content in cow's milk—around 80 percent—and so it is a valuable component. All casein products are manufactured from skim milk using a similar basic process: the casein is separated from the milk, purified by washing, and dried. However, the process is a little different according to whether acid or rennet casein is being made.

The first stage of making lactic acid casein is similar to cheese making. A 'starter' is added to the skim milk—a natural bacteria which converts the milk sugar (lactose) into lactic acid. After about 15 hours, the casein becomes insoluble and is separated from the whey. The casein is then washed in water four times to remove the remaining lactose and minerals, and dried in hot air until the moisture content is less than 12 percent. It is ground to a fine powder and bagged, with the final product containing more than 85 percent protein.

A more direct approach to precipitating the casein is to add a mineral acid directly to the skim milk.

In its insoluble form, acid casein does not presently have many uses. To make it soluble, the casein is neutralized by adding an alkali. Alternatively, caseinates (which have different properties from casein) can be made by adding different dissolving salts to the insoluble acid casein. Both acid casein and caseinates, the salts of caseins, are widely used in the food industry and they have some technical uses also. Caseinates are made by dissolving acid casein in a suitable hydroxide and drying it to make a water soluble product.

Rennet casein is produced by adding a rennet enzyme to the skim milk. A gel forms after about 20 minutes which is then 'cooked' to form a mixture of casein and whey. The process of manufacturing rennet casein is similar to the manufacture of acid casein. Rennet casein is mainly used to make imitation cheese (which has an important role in the fast food trade), although some is also used to manufacture plastic products such as buttons. Rennett casein is generally used in the manufacturing of products. Because of its good dye binding ability and excellent extrusion properties, it is ideal for use in plastics such as buttons, beads, buckles, knitting needles, and high quality plastics for jewelry.

Casein is a naturally occurring protein and is specific and identifiable in terms of its composition and, for purposes of the present invention, is not necessarily dependant upon a process for production thereof.

Casein is the primary protein in manufactured milk portein isolates, also known as total milk proteins. Such milk protein isolate products contain all of the proteins found in milk and generally are about 80% casein and 20% whey proteins.

As seen in the discussion above, in an acidic environment, casein is insoluble. However, for nutritional food compositions, solutions with low pH values in the range of 2.0 to 5.5 are preferred because the acidity of the solutions normally provides a high level of antimicrobial activity. Thus it can be seen that because it has such high nutritional value, it would be desirable to utilize casein or milk protein isolates containing mostly casein as the source of protein in antimicrobial food compositions, but efforts have heretofore been hampered by the tendency of casein to form precipitants when in an acidic, antimicrobial environment.

Accordingly, it would be highly desirable to provide a liquid food composition which would produce a low viscosity solution which has a pH in the range of about 2.0 to 5.5, has a high antimicrobial activity, has an extended shelf life at room temperature, utilizes casein as a protein source, and which prevents protein from precipitating or settling from solution when the solution is sterilized using retort sterilization techniques.

Therefore, it is a principal object of the invention to provide an improved food composition.

Another object of the invention is to provide a process utilizing casein in the manufacture of a low pH liquid food composition, which has a high antimicrobial activity and an extended shelf life.

Another object of the invention is to provide a low pH liquid food composition which includes casein as the primary protein source and which generally prevents protein from precipitating or separating from the liquid food composition.

A further object of the invention is to provide a nutritionally balanced liquid food composition, which includes a low pH protein stabilizer system, has high antimicrobial activity and an extended shelf life at room temperature.

These and other, further and more specific objects and advantages of the invention will be apparent to those skilled in the art from the following detailed description thereof.

SUMMARY OF THE INVENTION

Briefly, I have discovered a method of manufacturing a low pH liquid food composition, which has high antimicrobial activity and extended shelf life utilizing casein or milk protein isolates comprised mostly of casein, as the protein source for the food composition. The method comprises the steps of adding pectin to water which has been heated to between about 85° to about 170° F. (about 29.4° to about 76.6° C.) under agitation to form a first solution; mixing milk protein isolates, primarily casein, into the first solution under a small amount of agitation for between about 10 minutes to about 60 minutes, preferably for between about 15 minutes to about 30 minutes, to form a colloidal suspension; adding acid to the colloidal suspension to bring the pH of the colloidal suspension to between 3.1 and 6; adding one or more of carbohydrates, triglycerides, vitamins, emulsifiers, antimicrobial agents (preservatives), antifoaming agents, colorings or flavorings to the colloidal suspension; homogenizing the colloidal suspension using a multi-stage homogenization process with a minimum total pressure of 6000 psi; adding minerals to the homogenized colloidal suspension; and sterilizing the homogenized colloidal suspension using retort sterilization. The final food composition includes from about 50% to 95% by weight of water, preferably from about 60% to abou 80%; from about 0.25% to about 5.0%, preferably about 0.35% to about 1.0% by weight of a pectic substance, preferably pectin; from about 3.3% to about 18% by weight of casein; from about 2.0% to 22% by weight, preferably about 3.0% to about 10% by weight of triglycerides of predominantly 6 to 26 carbon atoms in the fatty acid chain; from about 8% to 78% by weight of carbohydrates selected from the group consisting of corn syrup solids, trisaccharides, tetrasaccharides, pentasaccharides, hexasaccharides, dextrose, fructose, sucrose, maltose, oligosaccharides and high saccharides; from about 0.01% to about 5.0% by weight of an emulsifier; from about 0.1% to 6.0% by weight of an edible acid; and from about 0.01% to about 6.0% by weight of an antimicrobial agent selected from the group consisting of sorbic acid, benzoic acid, sodium benzoate, potassium sorbate, sodium sorbate, and potassium benzoate. The food composition may be nutritionally enhanced through the addition of one or more vitamins or minerals. The food composition provides up to about three calories per cubic centimeter of composition. The composition forms a liquid colloidal suspension, which has an osmolarity of about 185 to about 400 mosm/L. The pH of the reconstituted food composition is from 2.0 to 5.5, preferably between about 3.1 to about 3.45.

DETAILED DESCRIPTION OF THE INVENTION

Milk proteins are widely used in the manufacture of food products due to their excellent nutritional values. Casein is the principal protein of cow's milk. It is the curd that forms when milk is left to sour. It is the most commonly used milk protein in the food industry and contains 21 amino acids. Acid casein, a granular milk protein, is available in two types—edible and technical. Edible acid casein is highly nutritional, low in fat and cholesterol, and flavorful, making it ideal for medical and nutritional applications. However, as discussed in more detail above, casein has seen only limited use in low pH food compositions due to its tendency to form a precipitant, effectively reducing the viable shelf life of such products and hindering the use of commonplace sterilization techniques such as retort sterilization.

The present invention is a process for manufacturing a low pH, highly nutritional food composition utilizing casein as the sole or majority protein source with high antimicrobial activity and long shelf life when stored at room temperatures.

The process of the present invention begins by heating the desired volume or weight of water, preferably purified or distilled, to between about 85° to about 170° F. (about 29.4° to about 76.6° C.). While it is possible to manufacture the food composition with liquid such as alcohol, the base liquid will ordinarily be principally water. The water may contain additional ingredients such as alcohol, glycerol, propylene glycol, sugars and flavor. The ratio of water to composition will vary with the proportion of the ingredients of the composition and with the desired consistency required.

As would be appreciated by those of skill in the art, the amount of water admixed to produce a food composition colloidal suspension can vary widely as desired. The amount of water mixed depends on the calories/ml desired, the desired viscosity of the resulting solution, etc. A water based food composition can include about 50% to 95% by weight water but preferably includes from about 60% to about 80% by weight water.

Once the water reaches the desired temperature, pectin is then introduced into the water, preferably under high agitation. Care must be taken in hydrating pectin due to its tendency to clump rather than dissolve completely in solution. Hydrating pectin is preferably performed by separating the pectin particles from each other just before they contact the water. Any of the known methods of conveniently hydrating pectin, such as separating the water with air through an eductor funnel, or introducing the pectin particles into fast moving water (i.e., high shear), are acceptable. Presently, high agitation is preferred to assist in hydrolyzing the pectin.

The food composition of the present invention includes between about 0.25% to about 5.0%, preferably about 0.35% to about 1.0%, by weight of a pectic substance derived from galacturonic acid selected from the group consisting of protopectins, pectins, pectinic acids, and pectic acids. The presently preferred pectic substance is pectin. The pectic substance functions to prevent the precipitation of the milk proteins, especially casein, when the food composition formulated in accordance with the invention is brought to the desired pH and when undergoing sterilization to kill substantially all microorganisms in the food composition. In other words, the pectic substance has been found effective to function as a stabilizer which prevents the coagulation, clustering, and precipitation of milk proteins, including caseins, in high temperature acidic conditions.

Once the pectin is hydrolized, the agitation is reduced to a low agitation or slow stirring and the milk protein isolates, including primarily caseins, or alternately, casein alone, are added to the hydrolized pectin solution. Maintaining low agitation, the pectin solution and milk proteins are allowed to mix for between about 10 minutes to about 60 minutes, preferably for between about 15 minutes to about 30 minutes, to form a colloidal suspension of casein and pectin complexes.

Pectin has been found to stabilize milk and other directly acidified products. Milk is largely a suspension of water insoluble casein particles. At milk's ambient pH of 6.8, casein particles have a net negative charge. Having a negative charge, the casein particles repel each other. Thus, in milk or water, the casein particles are kept in suspension indefinitely through the Brownian motion of the water molecules.

When the pH of water containing casein particles is lowered to about 4.6, the net charge on each casein particle approaches zero. Even then, each casein particle retains areas of positive and negative charge which attract the casein particles to each other, forming larger and larger clumps of casein particles until the Brownian motion of the fluid cannot keep the clumps in suspension. The result is casein precipitate.

Since pectin has a net negative charge above 3.5 pH, it is theorized that the pectin particles are attracted by electrostatic charge to the areas of positive charge on the larger casein particles forming an electrostatic complex of casein and pectin. The net negative charge of these casein and pectin complexes again repel each other, once again allowing the Brownian motion of the water molecules to keep the casein and pectin complexes in a colloidal suspension.

The amount of milk protein isolate (at least 70% casein, but typically and preferably about 80% casein) or casein or caseinate proteins used in the present food composition may vary widely, but for most applications the amount of milk protein isolates ranges from about 4.0% to about 20% by weight. More importantly, the insoluble component of such milk protein isolates (i.e., caseins or caseinates) ranges from between about 3.3% to about 18% on a dry weight basis of the final food composition, preferably between about 3.5% to about 6.0%.

The presently preferred total milk isolate of the present invention is TMP 1100 Milk Protein Isolate produced by New Zealand Milk Products, Inc. of Santa Rosa, Calif. (Specification No. 211100, incorporated herein by reference). TMP 1100 Milk Protein Isolate is a spray dried, soluble milk protein manufactured by a process in which casein and whey proteins are isolated together from fresh skim milk. TMP 1100 Milk Protein Isolate about 80% casein and about 20% whey proteins.

After allowing the requisite time for the formation of casein and pectin complexes in the colloidal suspension, the colloidal suspension is brought to the desired pH through the addition of an edible acid. The food composition includes from about 0.1% to about 6.0% by weight edible acids such as malic acid, acetic acid, citric acid, lactic acid, sodium acetate, fumaric acid, or an acidic salt such as sodium acetate in order to adjust the pH within the range of about 2.0 to about 5.5, preferably about 3.1 to about 3.45. This pH is critical to the extended shelf life of the invention. Any pH in excess of about 6 is not preferred because such pH allows greater microbial activity. The presently preferred edible acids are lactic acid and citric acid.

Once titrated to the desired pH, the next step of the process is the blending in of other desired, non-mineral components such carbohydrates, triglycerides, vitamins, emulsifiers, antimicrobial agents (preservatives), anti-foaming agents, food colorings or flavorings. Such components may be added in any desired order or simultaneously to the colloidal suspension to provide the desired nutrients, calories, vitamins, taste or processing attributes. It is presently preferred to blend in the vitamins as the last component added prior to homogenization.

Medium-chain triglycerides (MCT's) utilized in the food composition of the invention produce a composition of low viscosity while concomitantly providing high caloric content and easily digestible compositions. The fatty acid chains of medium-chain triglycerides are predominantly between about 6 to 12 carbon atoms, and are preferably utilized in conjunction with long-chain triglycerides (LCT's) in which fatty acid chains are predominately between about 14 to 26 carbon atoms.

The proportion of LCT's and MCT's in the food composition can vary widely, but typically is about 2% to about 22% by weight, with about 3% to about 10% being the preferred range.

Any food grade emulsifier is used for present emulsification purposes and combinations for emulsifiers are used if desired. Any of the long fatty acid glycerol emulsifiers which normally have a C-12 to C-20 esterified chain can be used. Typical among these are glycerol-lactopalmitate or the stearate. Alternately, propylene derived emulsifiers may be used, such as propylene glycomonosterate, or oleate, palmitate, and myristate. Likewise, the "Span" series of emulsifiers may be used. These are well-known emulsifiers and are fatty acid partial esters of the sorbitol anhydrides (or sorbitan). One well-known emulsifier is the "Tween" series of polyoxyethylene derivatives of fatty acid partial esters of sorbitol anhydride. Tween 80 and Atmos 300 are often used in combination. The well-known Atmos series of mono and diglycerides may be used. Also, lecithin is a suitable emulsifier. The amount of the emulsifier is chosen to suit the particular food composition, and generally ranges from about 0.01% to about 5% by weight.

The food composition contains from about 8% to about 78% by weight of carbohydrates. The carbohydrates may be any of the digestible carbohydrates such as dextrose, fructose, sucrose, maltose, oligosaccharides, high saccharides, or mixtures thereof, depending on usage.

The food composition also includes between about 0.01% to about 6% by weight of a sorbate or benzoate antimicrobial agent or preservative such as sorbic acid, benzoic acid, potassium sorbate, sodium sorbate, potassium benzoate, sodium benzoate, and the like. Such benzoates and sorbates are crucial because at low pH values in the range of 2.0 to 5.5, they provide significant antimicrobial activity.

Between about 0.5% to about 3.0% by weight of vitamins, minerals, and other trace elements can be used to supplement the food composition and for purposes of total nutritional balance. These supplements can be varied as desired but are typically equal to the RDA or greater based on 2,000 calories. Soy bran, rice bran, arabic gum, or other fiber polysaccharides or sources of fiber can be included in the food composition. However, as described in more detail below, it is important in the process of the present invention that any minerals be added to the colloidal suspension after homogenization.

Conventional coloring agents, such as the FDA colors, may be used, as well as conventional preservatives, such as BHT and BHA. BHT and BHA preserve fats.

After the admixture or blending of all components of the food composition excluding any minerals to the colloidal solution, the colloidal solution is homogenized using a multi-stage homogenization process with a minimum total pressure of 6000 psi. The higher than typical pressure of the homogenization process utilized in the present invention is critical. The high pressure separates any agglomerated protein particles and assists in the ready formation of casein and pectin complexes. Lower pressure homogenization processes are unsuitable as the pressure is not always sufficient to separate all agglomerated casein proteins.

After homogenization, the desired minerals, if any, are admixed or blended into the homogenized colloidal suspension. This has been found to be a critical step in the process of the present invention. If the minerals are added to the colloidal suspension prior to high-pressure homogenization, the resulting colloidal suspension quickly curdles with many precipitants forming. It is theorized that the high ionic charges of many minerals are responsible for this increased precipitation and inability to undergo homogenization. The minerals are believed to bind with the proteins, displacing part or all of the protective pectin layer which otherwise prevents precipitation. Removing the protection afforded by the pectic substance results in increased agglomeration and the concomitant formation of undesirable precipitants. Without the addition of minerals, the pectin-casein complexes are able to withstand and may even benefit from the smaller average particle size, including pectin-casein complexes, resulting from the homogenization process.

Finally, after the addition of minerals, the liquid colloidal suspension food composition of the present invention is packaged and sterilized using retort sterilization for sale to consumers.

The caloric content of the food composition of the invention is adjusted to any desired level up to about 3 calories per cubic centimeter. One half to two calories per cubic centimeter is preferred.

The osmolarity of the food composition is in the range of 185 to 400, but preferably is in the range of 275 to 350 mosm/ per liter of 1 calorie per cubic centimeter food.

The following examples depict the presently preferred embodiments of the invention for the purposes of illustrating the practice thereof and not by way of limitation of the scope of the invention. In the examples, all proportions are by weight, unless otherwise noted.

EXAMPLE 1

A food composition in colloidal suspension form was prepared by blending the ingredients listed below according to the inventive process described above.

| Amount for 16016.1 (2.55.70 g, 9.02 oz-wt) Servings | Food Item | % Wt |
|---|---|---|
| 6931 lb | Water | 76.77% |
| 1195 lb | Maltrin Maltodextrin 10 DE | 13.24% |
| 55.426 lb | MCT Oil MJ | 0.61% |
| 100 lb | Canola Oil | 1.11% |
| 120 lb | Safflower Oil Linoleic (over 70%) | 1.33% |
| 410 lb | Milk Protein Isolate, TMP 1100 | 4.54% |
| 58 lb | Pectin | 0.64% |
| 4.619 lb | Lecithin | 0.05% |
| 12.471 lb | Potassium Sorbate | 0.14% |
| 3.972 lb | Ascorbic Acid (Vitamin C) | 0.04% |
| 46.188 lb | Lactic Acid (88% sol.) | 0.51% |
| 0.924 lb | ZeolexSilicon Dioxide/Silica, AmorphousHB | 0.01% |
| 5.543 lb | Choline Chloride | 0.06% |
| 28.443 lb | Vitamin Premix (basic) | 0.32% |
| 56.886 lb | Mineral Premix (basic) | 0.63% |

The approximate percent calories from the various ingredients are carbohydrates 54.3%, fat 29.0%, and protein 16.7%. The resulting drink provides 1.06 calories per cubic centimeter and has a pH of about 3.25. The resulting food composition contains about 3.63% by weight casein proteins and about 0.91% by weight whey proteins.

EXAMPLE 2

A food composition in colloidal suspension form was prepared by blending the ingredients listed below according to the inventive process described above.

| Amount for 11962.4 (256.90 g, 9.06 oz-wt) Servings | Food Item | % Wt |
|---|---|---|
| 4774.54 lb | Water | 70.47% |
| 1000 lb | Maltrin Maltodextrin 10 DE | 14.76% |
| 41.75 lb | MCT Oil MJ | 0.61% |
| 105 lb | Canola Oil | 1.55% |
| 422 lb | Milk Protein Isolate, TMP 1100 | 6.23% |
| 30 lb | Pectin | 0.44% |
| 3.464 lb | Lecithin | 0.05% |
| 4.157 lb | Choline Chloride | 0.06% |
| 9.353 lb | Potassium Sorbate | 0.14% |
| 2.979 lb | Ascorbic Acid (Vitamin C) | 0.04% |
| 42 lb | Lactic Acid (88% sol.) | 0.62% |
| 0.693 lb | ZeolexSilicon Dioxide/Silica, AmorphousHB | 0.01% |
| 42.664 lb | Mineral Premix (basic) | 0.63% |
| 21.332 lb | Vitamin Premix (basic) | 0.32% |
| 275.25 lb | Safflower Oil Linoleic (over 70%) | 4.06% |

The approximate percent calories from the various ingredients are carbohydrates 42.0%, fat 41.0%, and protein 17.0%. The resulting drink provides 1.5 calories per cubic centimeter, has a pH of about 3.25, and has an osmolarity of 250 mosm/L. The resulting food composition contains about 4.98% by weight casein proteins and about 1.25% by weight whey proteins.

EXAMPLE 3

A food composition in colloidal suspension form was prepared by blending the ingredients listed below according to the inventive process described above.

| Amount for 15108.2 (262.00 g, 9.24 oz-wt) Servings | Food Item | % Wt |
|---|---|---|
| 6866.96 lb | Water | 78.69% |
| 675 lb | Maltrin Maltodextrin 10 DE | 7.74% |
| 88.41 lb | Krystar Crystalline Fructose Sweetner ST | 1.01% |
| 70.73 lb | MCT Oil MJ | 0.81% |
| 245 lb | Canola Oil | 2.81% |
| 88.41 lb | Safflower Oil Linoleic (over 70%) | 1.01% |
| 390 lb | Milk Protein Isolate, TMP 1100 | 4.47% |
| 34.04 lb | Pectin | 0.39% |
| 4.42 lb | Lecithin | 0.05% |
| 3.094 lb | Choline Chloride | 0.04% |
| 11.9 lb | Potassium Sorbate | 0.14% |
| 2.431 lb | Ascorbic Acid (Vitamin C) | 0.03% |
| 88.41 lb | Arabic Gum (Acacia) - Natural ME | 1.01% |
| 44.2 lb | Lactic Acid (88% sol.) | 0.51% |
| 0.884 lb | ZeolexSilicon Dioxide/Silica, AmorphousHB | 0.01% |
| 1.768 lb | Acesulfame-K (Potassium) Sweetener RCC | 0.02% |
| 0.354 lb | Food Coloring-FC&C Yellow #5 HD | 0.00% |
| 0.023 lb | Food Coloring-FD&C Yellow #6 HD | 0.00% |
| 73.67 lb | Mineral Premix - Diabetic | 0.84% |
| 36.84 lb | Vitamin Premix - Diabetic | 0.42% |

The approximate percent calories from the various ingredients are carbohydrates 40.0%, fat 42.0%, and protein 18.0%. The resulting drink provides 1.06 calories per cubic centimeter and has a pH of about 3.25. The resulting food composition contains about 3.58% by weight casein proteins and about 0.89% by weight whey proteins.

EXAMPLE 4

A food composition in colloidal suspension form was prepared by blending the ingredients listed below according to the inventive process described above.

| Amount for 16009.5 (260.00 g, 9.17 oz-wt) Servings | Food Item | % Wt |
|---|---|---|
| 5678 lb | Water | 61.88% |
| 1308 lb | Maltrin Maltodextrin 10 DE | 14.25% |
| 609 lb | Sucrose | 6.64% |
| 409 lb | Safflower Oil Linoleic (over 70%) | 4.46% |
| 365 lb | Canola Oil | 3.98% |
| 575 lb | Milk Protein Isolate, TMP 1100 | 6.27% |
| 35 lb | Pectin | 0.38% |
| 9.401 lb | Lecithin | 0.10% |
| 8 lb | Choline Chloride | 0.09% |
| 12.47 lb | Potassium Sorbate | 0.14% |
| 0.1 lb | Ascorbic Acid (Vitamin C) | 0.00% |
| 71.2 lb | Lactic Acid (88% sol.) | 0.78% |
| 64.235 lb | Mineral Premix - Renal | 0.70% |
| 32.117 lb | Vitamin Premix - Renal | 0.35% |

The approximate percent calories from the various ingredients are carbohydrates 43.0%, fat 43.0%, and protein 14.0%. The resulting drink provides 2.0 calories per cubic centimeter and has a pH of about 3.25. The resulting food composition contains about 5.02% by weight casein proteins and about 1.25% by weight whey proteins.

EXAMPLE 5

A food composition in colloidal suspension form was prepared by blending the ingredients listed below according to the inventive process described above.

| Amount for 16162.3 (262.12 g, 9.25 oz-wt) Serving | Food Item | % Wt |
|---|---|---|
| 5762.52 lb | Water | 61.31% |
| 1230 lb | Maltrin Maltodextrin 10 DE | 13.17% |
| 658 lb | Sucrose | 7.05% |
| 75.49 lb | MCT Oil MJ | 0.81% |
| 700 lb | Corn Oil | 7.49% |
| 650 lb | Milk Protein Isolate, TMP 1100 | 6.96% |
| 35.38 lb | Pectin | 0.38% |
| 9.44 lb | Lecithin | 0.10% |
| 12.74 lb | Potassium Sorbate | 0.14% |
| 2 lb | Ascorbic Acid (Vitamin C) | 0.02% |
| 77 lb | Lactic Acid (88% sol.) | 0.82% |
| 4.72 lb | Choline Chloride | 0.05% |
| 42.853 lb | Vitamin Premix Basic 2.0 | 0.91% |
| 85.706 lb | Mineral Premix Basic 2.0 | 0.46% |
| 29.86 lb | Orange Flavor | 0.32% |

The approximate percent calories from the various ingredients are carbohydrates 43.2%, fat 40.1%, and protein 16.7%. The resulting drink provides 2.0 calories per cubic centimeter and has a pH of about 3.25. The resulting food composition contains about 5.57% by weight casein proteins and about 1.39% by weight whey proteins.

EXAMPLE 6

A food composition in colloidal suspension form was prepared by blending the ingredients listed below according to the inventive process described above.

| Amount for 16162.2 (262.12 g, 9.25 oz-wt) Servings | Food Item | % Wt |
|---|---|---|
| 5716.52 lb | Water | 61.31% |
| 1230 lb | Maltrin Maltodextrin 10 DE | 13.17% |
| 658 lb | Sucrose | 7.05% |
| 75.49 lb | MCT Oil MJ | 0.81% |
| 700 lb | Corn Oil | 7.50% |
| 650 lb | Milk Protein Isolate, TMP 1100 | 6.96% |
| 35.38 lb | Pectin | 0.38% |
| 9.44 lb | Lecithin | 0.10% |
| 12.74 lb | Potassium Sorbate | 0.14% |
| 2 lb | Ascorbic Acid (Vitamin C) | 0.02% |
| 77 lb | Lactic Acid (88% sol.) | 0.82% |
| 4.72 lb | Choline Chloride | 0.05% |
| 42.853 lb | Vitamin Premix Basic 2.0 | 0.46% |
| 85.706 lb | Mineral Premix Basic 2.0 | 0.92% |
| 29.86 lb | Lemon Flavor | 0.42% |

The approximate percent calories from the various ingredients are carbohydrates 43.2%, fat 40.1%, and protein 16.7%. The resulting drink provides 2.0 calories per cubic centimeter and has a pH of about 3.25. The resulting food composition contains about 5.57% by weight casein proteins and about 1.39% by weight whey proteins.

The food composition of the invention is ingested at any desired point along the digestive tract, but ordinarily is administered to a patient orally or is tubally fed directly into the patient's stomach. If appropriate, the reconstituted food composition can be tubally directly fed into the intestinal tract or the esophagus.

While several embodiments of the present invention have been disclosed, it is to be understood by those skilled in the art that other forms can be adopted, all coming within the spirit of the invention and scope of the appended claims:

I claim:

1. A method for preparing a sterile food composition, said method comprising the steps of:
    (a) heating a desired amount of water to between about 85° to about 170° F.;
    (b) hydrating between about 0.25% to about 5.0% by weight of a pectic substance in the heated water to form a pectin solution;
    (c) mixing into the pectin solution between about 3.3% to about 18% by weight of a milk protein isolate, said milk protein isolate containing at least 70% casein, to form a colloidal suspension of casein and pectin complexes;
    (d) maintaining low agitation of the colloidal suspension for between about 10 minutes to about 60 minutes;
    (e) adding from about 0.1% to about 6% by weight of an edible acid to the colloidal suspension for adjusting the pH of the food composition within the range of about 2.0 to about 5.5;
    (f) blending from about 8% to about 78% by weight of carbohydrates into the colloidal suspension, said carbohydrates selected from the group consisting of corn syrup solids, trisaccharides, tetrasaccharides, pentasaccharides, hexasaccharides, dextrose, fructose, sucrose, maltose, oligosaccharides and higher saccharides;
    (g) blending from about 2% to about 22% by weight of triglycerides of predominately 6 to 26 carbon atoms in the fatty acid chain into the colloidal suspension;
    (h) blending from about 0.01% to 6% by weight of an antimicrobial agent into the colloidal suspension, said antimicrobial agent selected from the group consisting of sorbic acid, benzoic acid, sodium benzoate, potassium sorbate, sodium sorbate, and potassium benzoate;
    (i) homogenizing the colloidal suspension using a multi-stage homogenizer with a minimum total pressure of 6000 psi to form an unsterilized food composition; and
    (j) sterilizing the unsterilized food composition.

2. The method of claim 1 wherein the sterilizing step comprises retort sterilization.

3. The method of claim 1 further comprising the step of blending one or more minerals into the unsterilized food composition.

4. The method of claim 1 further comprising the step of blending one or more vitamins into the unsterilized food composition.

5. The method of claim 1 further comprising the step of blending one or more vitamins into the colloidal suspension anytime prior to sterilization.

6. The method of claim 1 further comprising the step of blending one or more vitamins into the colloidal suspension immediately prior to homogenization.

7. The method of claim 1 further comprising the step of blending from about 0.1% to about 5% by weight of an emulsifier into the colloidal suspension.

8. The method of claim 1 wherein the pectic substance is selected from the group consisting of protopectins, pectins, pectinic acids, and pectic acids.

9. The method of claim 1 wherein the pectic substance is pectin.

10. The method of claim 1 wherein the edible acid is selected from the group consisting of malic acid, acetic acid, citric acid, lactic acid, sodium acetate, fumaric acid, and acidic salts.

11. The method of claim 1 wherein the antimicrobial agent is selected from the group consisting of sorbic acid, benzoic acid, sodium benzoate, potassium sorbate, sodium sorbate, and potassium benzoate.

12. The method of claim 1 wherein the pH of the food composition is adjusted with an edible acid within the range of about 3.1 to about 3.45.

13. A homogenized food composition comprising a colloidal suspension comprising:
    a) about 50% to about 95% by weight of water;
    b) about 0.25% to about 5.0% by weight of a pectic substance;
    c) about 3.3% to about 18% by weight of a milk protein isolate, said milk protein isolate containing at least 70% casein;
    d) an edible acid for adjusting the pH of the food composition within the range of about 2.0 to about 5.5;
    e) triglycerides of predominately 6 to 26 carbon atoms in the fatty acid chain;
    f) carbohydrates selected from the group consisting of corn syrup solids, trisaccharides, tetrasaccharides, pentasaccharides, hexasaccharides, dextrose, fructose, sucrose, maltose, oligosaccharides and higher saccharides;
    g) an antimicrobial agent selected from the group consisting of sorbic acid, benzoic acid, sodium benzoate, potassium sorbate, sodium sorbate and potassium benzoate; and
    h) wherein the homogenized food composition is packaged through a retort sterilization process.

* * * * *